April 6, 1965  J. SHIELDS  3,176,708

TAPPING AND VALVE ASSEMBLY FOR PLASTIC PIPE

Filed Dec. 6, 1962  2 Sheets-Sheet 1

INVENTOR
JOHN SHIELDS

BY *Harry C. Braddock*
ATTORNEY

April 6, 1965 J. SHIELDS 3,176,708
TAPPING AND VALVE ASSEMBLY FOR PLASTIC PIPE
Filed Dec. 6, 1962 2 Sheets-Sheet 2
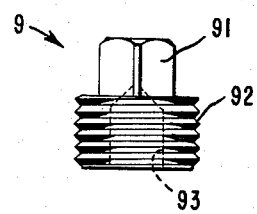
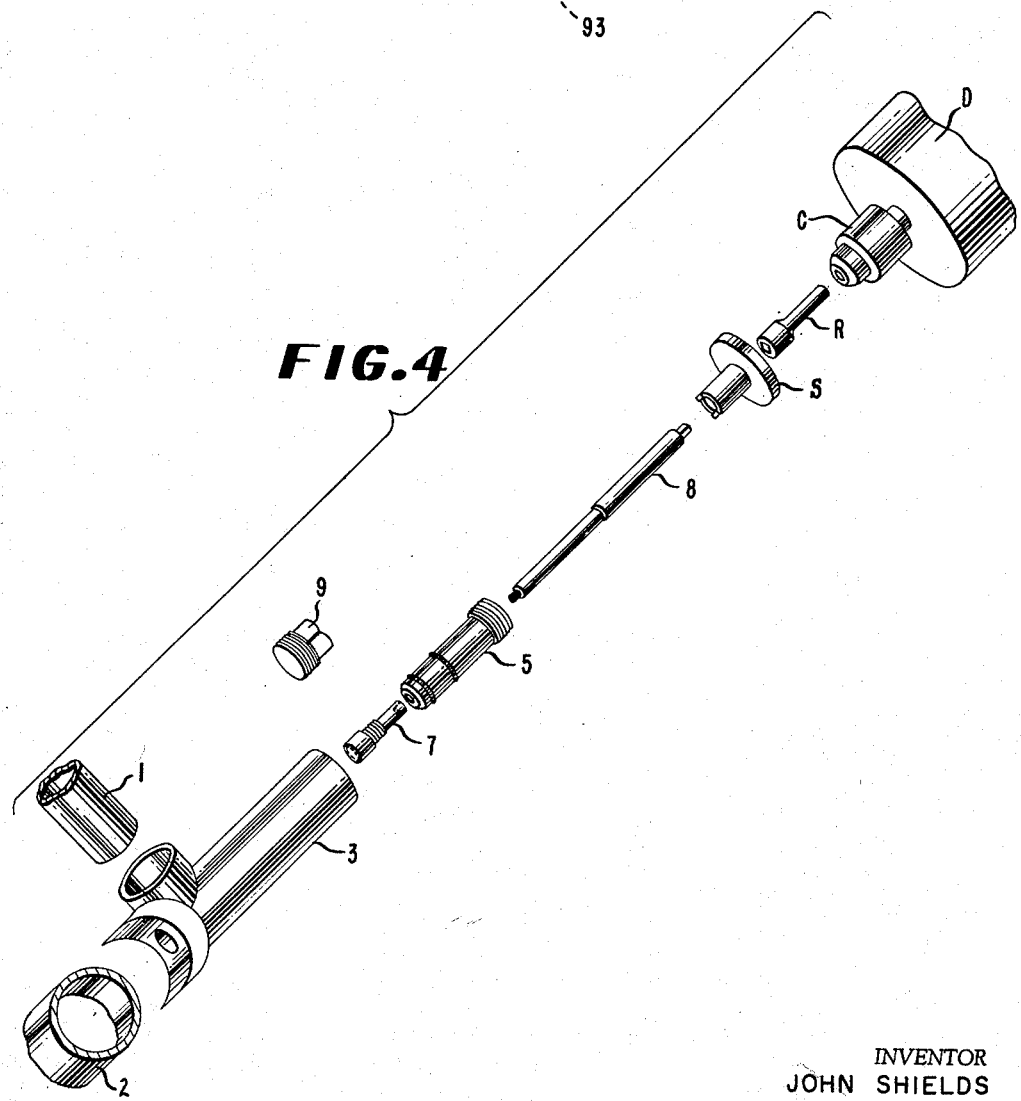
INVENTOR
JOHN SHIELDS
BY
*Harry C. Braddock*
ATTORNEY

United States Patent Office 3,176,708
Patented Apr. 6, 1965

3,176,708
TAPPING AND VALVE ASSEMBLY FOR PLASTIC PIPE
John Shields, Wilmington, Del., assignor to E. I. du Pont de Nemours and Company, Wilmington, Del., a corporation of Delaware
Filed Dec. 6, 1962, Ser. No. 242,815
5 Claims. (Cl. 137—318)

This invention generally relates to the field of fluid distribution systems, such as gas mains and lines which utilize conduits formed from plastic materials.

More specifically, this invention involves an improved fitting or assembly for connecting individual lines into an operating supply main without interruption of service on the supply main. The improved assembly provides a means for forming a new opening in the supply main and for controlling fluid flow after the new opening is formed.

Plastic pipes or conduits are used to an increasing extent as primary gas supply lines or mains and also as service lines connecting the primary gas supply lines to individual points of gas use such as dwellings. Many times, after a supply main has been established and placed in use supplying a number of dwellings, it becomes necessary to connect additional service lines into the supply main in order to serve additional later-built dwellings. It is very desirable to make the additional connections quickly, safely, and without interrupting operation of the supply main. In addition, it is important that the connection and new opening be made without creation of fine particles or introduction, into the lines, of pieces of the conduit wall being cut during formation of the new openings. Such fine particles or pieces of the plastic conduit wall are relatively light and would be carried along by the gas stream and plug or interfere with the operation of various elements of the gas system such as pressure-reducing valves, burners and the like.

It is one object of this invention to provide an improved assembly for connecting individual fluid conduits into a main supply conduit without interruption of service on the main supply conduit.

It is another object of the invention to provide such an assembly having an improved arrangement of parts for forming the new opening in the main supply conduit and for controlling fluid flow after the opening is formed.

It is a further object to provide such an assembly which is simple and rugged in construction, easy to produce and maintain, yet highly effective and reliable in operation.

It is yet another object to provide such an assembly having a modified and unique cutting arrangement for forming the opening in the main supply conduit without creation of fine particles or introduction of pieces of the conduit into the fluid stream during formation of the opening.

It is another object to provide this assembly with an improved fluid sealing arrangement for greater safety and efficiency.

Other objects and advantages will appear from a consideration of the specification and claims taken in conjunction with the accompanying drawings in which:

FIGURE 3 is a side elevational view of a threaded closure or plug element adapted to close the threaded end of the main passageway through the assembly of this invention.

FIGURE 4 is a perspective exploded view showing the general relationship of parts of the improved assembly of the invention with respect to each other, the conduit elements and the tools for operating the assembly; certain of the elements shown broken away.

Figure 1:
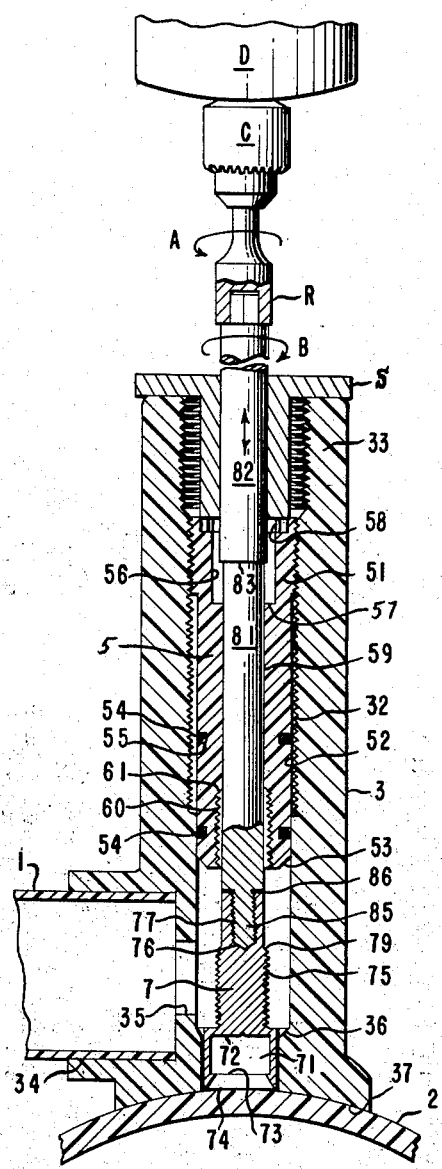
FIGURE 1 is a longitudinal cross-sectional view through the improved tapping and valve assembly of this invention with certain parts broken away to simplify the showing. The parts of the assembly are shown in position to commence cutting or forming this opening in the main supply conduit.

Referring to the drawings, the primary supply conduit, or main is indicated by the reference numeral 2 and the service conduit or line which is to be connected to the main 2 by the assembly of this invention is designated by reference numeral 1. The improved tapping and valve assembly of the invention comprises an elongated body 3 preferably formed of any suitable plastic material. A passageway extends longitudinally through body 3 and is provided with a smooth walled portion 31 and a threaded portion 32, both portions substantially the same in transverse cross-sectional dimensions. This passageway is also provided with an enlarged threaded portion 33. The structure of body unit 3 surrounding one end of this passageway is formed at 37 to engage the outer surface of the supply main for fluid-tight attachment thereto.

Passageway portion 31 is provided with abutment structure defining a valve seat 36 adjacent one end of the body unit 3. Adjacent the same end of the body unit 3 is a recess 34 for receiving one end of the service line or conduit 1. Recess 34 communicates with passageway portion 31 through aperture 35.

A first valve member 5 having an enlarged threaded head portion 51 and a smaller diameter shank portion 52 is received in threaded engagement with passageway portion 32 in the body unit 3. One end of member 5 is provided with a surface 53 which cooperates with valve seat 36 in the lowermost portion of member 5 as viewed in FIGURES 1 and 2 to prevent fluid flow between the lower end of passageway portion 31 and recess 34. Member 5 is moved longitudinally along the passageway in body unit 3 by rotatable engagement of its threaded portion 51 with threaded portion 32 of the passageway. The shank portion 52 of member 5 is provided with annular grooves 55 in which are mounted sealing rings 54 which cooperate with the interior of the passageway to prevent fluid flow along the exterior of member 5. Member 5 is provided with a passageway 59 extending longitudinally therethrough. One end of passageway 59 is provided with an enlarged portion 60 which is internally threaded. This enlarged threaded portion 60 forms a valve seat structure 61 in passageway 59. The other end of passageway 59 is enlarged at 56 to form an annular shoulder 57. If desired, a sealing ring may be provided between passageway 59 and element 8.

The structure of member 5 which defines the enlarged portion 56 of passageway 59 is cut away to form two diametrically opposed recesses 58, shown in FIGURE 1.

Mounted in one end of passageway 59 of member 5 is a second member 7 which is shown threadably secured at 77 to a portion 81 of freely rotatable drive shaft or element 8 which extends into passageway 59 of member 5. Movable member 7 is provided at one end with threaded bore 76 and at the other end with a cup-like frictionally heated melt cutter element defined by a cylindrical wall portion 71 having a cutting edge 74 surrounding a central cavity 72. The inner surface of wall portion 71 is undercut or notched at 73 to retain the piece P cut from the wall of the supply main 2. Member 7 is provided intermediate its ends with a somewhat enlarged threaded portion 75 which is threadably engageable with internally threaded portion 60 of passageway 59 in member 5. Shaft element 8 is slidably and rotatably received in passageway 59, and is provided with an enlarged portion 82 which forms a shoulder 83. Shoulder 83 cooperates with shoulder 57 in passageway 59 to limit sliding movement of shaft element 8 in the passageway and also to limit the depth of the cut made by the cutter element on member 7. The upper end of threaded portion 75 of member 7 as seen in FIGURES 1 and 2 forms a surface 79 which engages valve seat 61 in passageway 59 when member 7 is threadably received in passageway 59 to prevent fluid flow through passageway 59.

Figure 2:
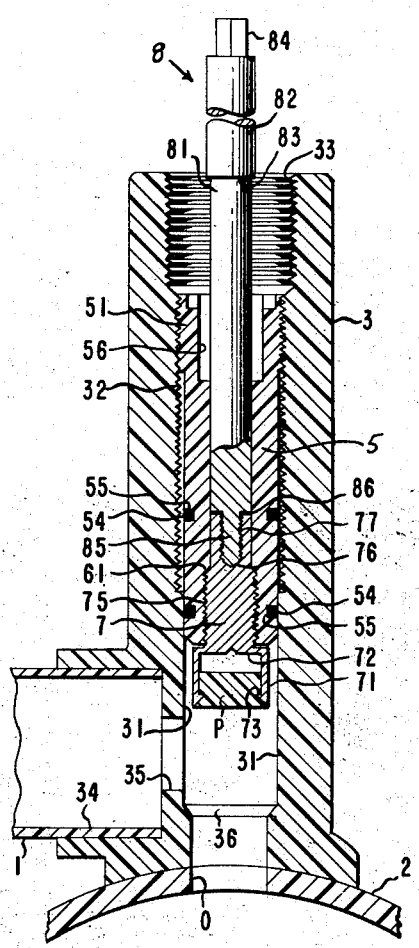
FIGURE 2 is a view similar to that of FIGURE 1 with the parts of the assembly shown in final position after the opening in the main supply conduit has been formed and after the member carrying the cutter element has been retracted to seal the central passageway in the main valve member.

The upper portion 82 of rotatable drive element 8 as seen in FIGURES 1 and 2 is provided with a lug 84 of polygonal transverse cross section for engagement with an adapter socket element R which is adapted to be secured in and driven by chuck C of power drill D. Element S is a spanner wrench part having an enlarged annular rim and a smaller diameter shank extending therefrom. Extending axially from the end of the shank of element S are two diametrically opposed prongs or projections for engagement in recesses 58 in the end of member 5 as shown in FIGURE 1 to control the rotation of member 5. Element S is provided with a central opening to accommodate drive element 8.

Plug or closure element 9 is threaded into enlarged portion 33 of the passageway through body member 3 to seal the upper end of the body unit after line 1 has been placed in satisfactory communication with supply conduit 2 and rotatable drive element 8 has been withdrawn.

In order to connect a service line 1 into a pressurized supply conduit 2 utilizing the assembly of this invention, the body unit 3 is attached to the outside of conduit 2 at surface 37 by suitable means such as heat fusion welding, solvent welding, or mechanical clamping against a conventional resilient sealing element. The service line 1 is then attached to the body unit 3 at recess 34 by similar suitable means. As a safety measure, air under pressure is applied through the top of the body unit 3, with the free end of line 1 plugged, to check for leakage.

Then rotary drive element 8 is inserted in passageway 59 of member 5 from the end having the enlarged portion 51 and element 7 is threadably engaged at 77 with portion 85 of the rotary drive element. Threaded portion 75 of member 7 is maintained out of engagement with the threaded recess 60 in the lower end of element 5 as seen in FIGURE 1. The threads of portion 75 and recess 60 are of opposite hand to threads provided on other threaded portions of the assembly. In this condition the rotary drive element 8 and member 7, now rigidly attached to each other, are rotatably and slidably received in passageway 59 of member 5.

Next, member 5 together with element 8 and member 7 are inserted in the passageway of the body unit 3. Member 5 is screwed into the passageway to the position shown in FIGURE 1 by means of spanner wrench part S which engages diametrically opposed recesses 58. Part S is maintained in fixed position to secure member 5 against rotation while power drill D and its socket adapter element R are engaged with the upper end of element 8 as shown in FIGURE 1. While still maintaining part S in fixed position, shaft element 8 and member 7 are slidably moved into body unit 3 until the cutting edge 74 of the member 7 cutting element engages the outside of conduit 2. About this time drill D is energized to rapidly rotate shaft 8 and member 7 with its melt cutter in engagement with conduit 2. Pressure is maintained to move the cutter into and through the wall of conduit 2 as the melt cutting action proceeds. Preferably for the size components generally used a minimum rotational speed of 1200 r.p.m. is used. The speed of rotation must be sufficient to generate enough heat when the cutter engages the conduit so that the melt cutting action results.

As the cutter proceeds through the conduit wall the inner part of the wall being cut enters cavity 72 in member 7 in a somewhat softened condition and becomes engaged behind the undercut lip 73. When the cutter element moves through the conduit wall the plug P is retained permanently in the end of member 7. In addition, due to the nature of the cutting action no fine particles or pieces of the conduit wall are formed or introduced into the system.

As previously mentioned the engagement of shoulder 83 with shoulder 57 prevents the cutter element from moving too far into conduit 2. When the cutting action has been completed the drill D and socket element R are disengaged from element 8. Element 8 is then withdrawn from the body unit 3 until portion 75 of member 7 engages the lower portion of member 5 at which time element 8 is rotated by suitable means such as a hand wrench to threadably engage threaded portion 75 of member 7 in the threaded recess 60 of member 5. This engagement is continued until surface 79 of member 7 is firmly sealed in fluid tight sealing relationship against valve seat surface 61 in member 5, as shown in FIGURE 2. At this point torque is increased on element 8 until the threaded extension 85 thereof breaks off at weakened section 86 and rotatable element 8 is withdrawn from the pasageway 59 in member 5.

Part S is removed and closure element 9 is positioned and sealed in threaded portion 33 of the passageway through body unit 3. The connection of line 1 and conduit 2 is now completed.

Should it become necessary to cut off flow of fluid into line 1, closure element 9 is removed and member 5 is rotated by suitable means such as a screwdriver to move member 5 downwardly in the body unit passageway until its lower end surface 53 as shown in FIGURE 1 engages valve seat 36.

It will be seen that fluid leakage past member 5 in the body unit passageway is prevented by the engagement of surfaces 79 and 61, also by action of the O rings or resilient seal elements 54 in annular grooves 55 and in engagement with the inner surface of the passageway.

Applicant has provided an assembly which achieves the enumerated objects of this invention, and others. Not only has the important feature of the cutting action been improved, among others, over prior devices but the assembly is so arranged and constructed that it can be easily actuated by one operator.

While a single preferred embodiment has been disclosed in accordance with the patent law, modifications and changes within the spirit of this invention will occur to those skilled in the art. Such modifications and changes are considered to fall within the scope of the following claims.

I claim:

1. An improved tapping and valve assembly attachable to plastic pipes, said assembly comprising; a body unit having a first passageway therethrough and a second passageway intersecting said first passageway, said body unit provided with structure surrounding one end of said first passageway and adapted to engage a plastic pipe in fluid-tight relationship therewith, said first passageway provided with an abutment forming a first valve seat between said one end of said first passageway and the intersection of said first and second passageways, a movable first valve member slidably mounted in said first passageway for movement between a first position in fluid-tight engagement with said valve seat to prevent fluid communication between said one end and said intersection, and a second position spaced from said valve seat in which position fluid communication is established between said one end and said intersection, a first means cooperating with said body unit and said valve member for moving said valve member between said two positions, said valve member provided with a third passageway extending therethrough in a direction generally parallel to the direction of sliding movement of said valve member in said first passageway, a portion of said third passageway defining a second valve seat, a movable second valve member slidably mounted in said third passageway between a first position in fluid-tight engagement with said second valve seat and a second position spaced therefrom, said second valve member provided with a plastic pipe cutting element operative to form an opening without creating chips or fine particles in a plastic pipe in engagement with said structure surrounding said one end of said first passageway when said second valve member is in its second position, a second means cooperating with said first valve member and said second valve member for releasably securing said second valve member in its first position, said second valve member provided with a third means for actuating said cutting element when said second valve member is in its second position, said first valve member being provided with a means cooperating with said first valve member and said first passageway to prevent fluid flow along said first passageway between said first valve member and the surface of said first passageway, said cutting element being a friction heat type rotating melt cutter operative to accomplish cutting action without applying significant force against said pipe and said second valve unit being additionally mounted in said third passageway for free rotation when in its second position, said cutting element being provided with a device for engaging and retaining the piece of plastic pipe formed during cutting to form the opening in a plastic pipe engaged with said assembly.

2. The improved assembly of claim 1 in which said cutting element comprises a cylindrical body portion provided at one end with a tapered central cavity to define an annular cutting edge portion for engaging the pipe surface said annular cutting edge portion comprising an inner undercut lip structure constructed and arranged to receive and retain the portion of pipe cut out by said annular cutting edge.

3. The improved assembly of claim 1 which comprises a closure element sealing off the other end of said first passageway.

4. The improved assembly of claim 1 which further comprises a detachable rotatable drive element extending into said third passageway cooperating with said third means for rotating said second valve element and its cutting element when said second valve member is in its second position.

5. The improved assembly of claim 4 in which said detachable rotatable drive element comprises a limit stop means cooperating with the structure of said second valve element defining said third passageway to limit the depth of the cutting action of said cutting element.

References Cited by the Examiner

UNITED STATES PATENTS

| | | | |
|---|---|---|---|
| 2,794,352 | 6/57 | Mueller | 77—42 |
| 3,045,511 | 7/62 | Risley | 77—38 |
| 3,068,724 | 12/62 | Mueller | 77—37 |

FOREIGN PATENTS 837,399 6/60 Great Britain.

WILLIAM W. DYER, *Primary Examiner.*

JOHN C. CHRISTIE, *Examiner.*